United States Patent
Higuchi et al.

(10) Patent No.: US 7,261,971 B2
(45) Date of Patent: Aug. 28, 2007

(54) BATTERY USED FOR SMALL ELECTRIC DEVICES

(75) Inventors: Hayato Higuchi, Suita (JP); Naoto Sugimune, Amagasaki (JP); Tohsiya Takaishi, Settsu (JP); Yoshiki Somatomo, Kyoto (JP)

(73) Assignee: Hitachi Maxell Ltd., Osaka (JP)

( * ) Notice: Subject to any disclaimer, the term of this patent is extended or adjusted under 35 U.S.C. 154(b) by 703 days.

(21) Appl. No.: 10/724,218

(22) Filed: Dec. 1, 2003

(65) Prior Publication Data
US 2004/0166406 A1    Aug. 26, 2004

(30) Foreign Application Priority Data
Dec. 2, 2002    (JP)    ............... P 2002-350502

(51) Int. Cl.
*H01M 2/02*    (2006.01)
*H01M 2/06*    (2006.01)
*H01M 2/08*    (2006.01)
*H01M 2/30*    (2006.01)

(52) U.S. Cl. .................. 429/94; 429/163; 429/178; 429/185

(58) Field of Classification Search .................. None
See application file for complete search history.

(56) References Cited

U.S. PATENT DOCUMENTS 6,531,246 B2 *    3/2003    Hanafusa et al. .......... 429/162
6,572,998 B2      6/2003    Kageyama
6,673,488 B2 *    1/2004    Furusaki .................... 429/163
2005/0112461 A1*  5/2005    Amine et al. .............. 429/185

FOREIGN PATENT DOCUMENTS

| JP | 8-83596 A | 3/1996 |
| JP | 9-213286 A | 8/1997 |
| JP | 11-185820 A | 7/1999 |
| JP | 1089362 A1 | 4/2001 |
| JP | 2001-167744 A | 6/2001 |
| JP | 2001-250517 A | 9/2001 |

* cited by examiner

*Primary Examiner*—Jonathan Crepeau
(74) *Attorney, Agent, or Firm*—Birch, Stewart, Kolasch & Birch, LLP (57)    ABSTRACT

A battery provided with one end of each lead element connected to the positive and negative electrode respectively is drawn out from the can body 3 through a space 6 formed at a surface part of said jointed flange section 32*a*, 32*b* and the area of the flange section around the drawing space is sealed by a resin bonding. The battery provided with a new structure which can solve the problems which may be generated in all fields, such as battery shape, attachment property, battery strength, productivity and so on in order to make a thin type battery.

12 Claims, 10 Drawing Sheets

BATTERY USED FOR SMALL ELECTRIC DEVICES

This nonprovisional application claims priority under 35 U.S.C. § 119(a) on Patent Application No. 2002-350502 filed in JAPAN on Dec. 2, 2002, the entire contents of which are hereby incorporated by reference.

BACKGROUND OF THE INVENTION

This invention relates to a battery suitable for using for power supply of small electric devices such as pocket electric equipments, especially to a thin type battery.

As the battery used for the power supply of small electric devices, there have been used, for example cylindrical and square shaped ones. The cylindrical or square shaped battery is provided with a metal can body which is made into a cylindrical shape or a prismatic shape respectively by means of a deep drawing process.

On the other hand, for a battery used for small and portable electric devices such as personal information terminals and portable telephones, relatively thin shaped batteries have been used as follows.

1) Type of metal can made by a deep drawing process in which an opening thereof is engaged with a metal lid by welding as shown in Japanese publication (unexamined) No. 11-185820.

2) Type of combination a laminated battery with an outer case for decreasing the total thickness thereof, which battery is made of lamination of metal foils such as aluminum foils with resin as shown in Japanese publication (unexamined) No. 8-83596.

3) Type of a shallow metal can like a lunch box made by a shallow drawing process in which an opening thereof is engaged and welded with a metal lid as shown in Japanese publications (unexamined) Nos. 11-185820, 9-213286, 2001-167744 and 2001-250517.

Nowadays, due to spread of the portable information terminals and cellular phone, a request for small lightweight to electric devices becomes stronger and therefore the demand for making a thinner battery becomes stronger.

However, in case of using the Type 1), there is limitation as to a formable size made by the deep drawing process. For example, it is quite difficult or impossible for the present deep drawing process to make a battery having a thickness of less than 3 mm.

Further, in case of making it into less than 3 mm in thick, there are the following problems as to the deep drawing process.

A) The opening width of battery becomes too thin to insert the electrode therethrough into the battery can body as the battery becomes thinner.

B) The metal lid for sealing the opening of battery can is provided at attaching holes thereof with terminals through an insulating packing or gasket. When the opening width becomes narrow and the insulating packing becomes close to the opening edge, heating during a welding process of the metal lid to the metal can will tend to melt the insulating packing.

C) The deep drawing process needs wrought materials such as formable kinds of metal. But, such materials having a small hardness are not strong against expansion of the battery. Thereby, the materials having a light-weight and a good strength as well as a strong hardness can not be used in the deep drawing process.

At the present, therefore a desired thin type battery has to be made by using lamination of film material as shown in the above 2) where metal foils having a thickness of less than 100 μm are laminated with resin. As for the laminated film materials, there is such a problem that the materials do not have enough strength against sticking and folding motions.

In case of Type of the can 3) made by shallow drawn process as shown above, for example although the batteries shown in the Japanese publications can avoid the problems as mentioned in Type of the can 1) made by deep drawn process, there are the following problems.

In this case, as a method for welding the circumference edge of lid with the opening edge of metal can, there has been used one of the groups consisting of a laser welding, a resistance welding, an ultrasonic welding and so on. However, it is necessary to seal takeoffs for leads connected to positive and negative electrodes as well as outer case of the battery by a metal welding. Further, in this structure where the metal lid is electrically connected to the metal lid to the metal can, the sealing of takeoffs needs a complete insulating treatment. In this case, there is generally used a resin packing for caulking. The sealing made by caulking is not reliable to avoid invasion of the humidity and leakage of the electrolyte in comparison with the sealing made by the metal welding and resin fusing. Therefore, in case of Type 3) more than two processes are needed to get a good reliability for avoiding leakage of the electrolyte, resulting in a bad productivity, due to problems such as large number of the production control items and their complexity.

On the other hand, in case of Type 2) the outer case made of lamination films can be sealed by resin, through which lead elements, connected to electrodes accommodated in the battery, are drawn out therefrom. In this structure, the sealing of the battery can be made at the same time of sealing the terminal drawing section, thereby a good productivity can being improved. However, in addition to the weak point of battery strength as mentioned above, there are further problems as follows when a secondary battery is provided with a necessary protection circuit.

In this type of battery using lamination films, a part of the lead element is protruded from the outer case and the protection circuit connected to the lead element is positioned outside of the battery, so that the volume energy density will become low. Although there is a method of bending the protection circuit linked to the lead toward the battery side and arranging the protection circuit on the sealing portion with resin, it is very difficult to make a further space for arranging the protection circuit and also to keep the position precision of the protection circuit after bending the lead element, resulting in a bad productivity.

SUMMARY OF THE INVENTION

Therefore, the main object of the present invention is to provide a new structure of the battery which can solve the problems which may be generated in all fields, such as battery shape, attachment property, battery strength, productivity and so on in order to make the thin type battery.

According to a first aspect of the present invention, there is provided a battery which comprises a) an electrode body made of lamination of a sheet-like positive electrode and a sheet-like negative electrode through a separator, b) a battery can body comprising a depression provided with a flange portion at a circumference part thereof for accommodating at least a part of the electrode body together with an electrolyte and c) a metal lid provided with a circumference portion used for sealing an opening of the can body by joining the flange portion of the can body and the corresponding circumference portions thereof, wherein one end of each lead element connected to the positive and negative electrode respectively is drawn out from the can body through a space formed at a surface part of the jointed flange section and the area of the flange section around the drawing space is sealed by a resin bonding.

In this invention, the jointed flange section means an area made by joining the flange portion of the metal can with the corresponding circumference portion of the metal lid and also the surface part of the jointed flange section means an upper and lower surface area of the jointed flange section except the circumference edge of the flange section.

In a preferred embodiment of the present invention, it is preferred that the positive electrode and/or negative electrode have a metal foil as a collector, which extension part serves as the lead element.

In another preferred embodiment of the present invention, the drawn end of the lead element serves as a portion electrically connected directly or indirectly to an outer circuit. Therefore, it is preferred that the drawn end portion is located on the flange section at the same position as the space for drawing out of the lead element or in a space which intersects perpendicularly with the flange section. In such a case, the wire length of the lead element can be shortened, and also the simplification of structure and the reduction of material cost can be obtained. Further in case of locating the drawn end portion of the lead element in the space which intersects perpendicularly with the flange section, it is advantageous for the lead end to connect to a terminal of the outer circuit such as the protection circuit because the lead end may be located somewhat far from the surface of the jointed flange section without damaging simplification of the wiring. It is also preferred that output terminals, electrically connected to each drawn end of the lead elements, are located on the flange section or in a space which intersects perpendicularly with the flange section.

In order to improve the volume energy density, the width of the jointed flange section except around the drawing space for leads had better be as narrow as possible. Therefore, it is preferred that the other part of the jointed flange section except an area around the drawing space may be sealed by at least one of means selected from the group consisting of a laser welding, an ultrasonic welding, a resistance welding, a friction churning junction, a pressure welding and caulking, rather than by the resin sealing. Further, it is also preferred that one of the flange portion of the can body and the circumference portion of the metal lid has an extension part capable of being folded back in the direction where the other portion of the jointed flange section may be overlapped further, because this structure makes the flange width narrower, resulting in increase of the volume energy density.

In order to improve the reliability for avoiding inversion of the humidity and leakage of the electrolyte, it is preferred that the jointed flange section is provided with a double sealing portion made of a preliminary inside resin sealing in addition to the flange section sealing by the above welding and so on. Further it is also preferred that at the folded back portion of the jointed flange section, at least a part of the can body and the metal lid is sealed by resin, thereby the resin sealing portions can improve the reliability for sealing.

In the present invention, the method of forming the can body and/or metal lid is not limited. Among the materials, it is preferred that the can body and/or metal lid may be formed by means of a shallow drawing process of a metal plate.

In order to depress expansion in a thickness direction of the battery can due to the expansion of electrode bodies and the increase of internal pressure in the battery, it is preferred that the metal lid and the surface of the can body which are opposite to each other are formed to have convex portions toward the interior of the battery and the amount of deformation of the central projection is 0.05-0.3 mm. If the deformation amount is less than 0.05 mm, the effect is not sufficient to avoid the expansion of the battery can. On the other hand, if the deformation amount is more than 0.3 mm, it makes the pressure against the electrode body larger than the electrode needs and decreases the internal capacity of can body. Further it is preferred that the area where the projections are formed should correspond to an area of the electrode body located in the battery in order to inhibit or avoid the expansion of the battery.

In a preferred battery according to the present invention, in order to make a space for locating the protection circuit and to improve the sealing in the space for drawing out the lead, it is preferred that a part of the flange portion (for example a first flange portion 32a in FIGS. 1 and 2) or a part of the joint flange section should be wider 1 mm or more than the other flange portion or the corresponding circumference portion (for example a second flange portion 32b). In this case, how much the former flange is wider than the latter flange should be determined depending on the size of the battery and the protection circuit. Generally the width increase is within 1 to 6 mm. On the flange section, or the flange portion of the can body or the metal lid, output terminals can be arranged. In such a case, the output terminals are preferably provided on the wider flange portion or the wider flange section.

In a preferred embodiment according to the present invention, the electrode body may be formed in a cross-sectional shape of ellipse in a direction perpendicular to a winding axis of the electrode body by winding lamination of the sheet-like positive electrode and the sheet-like negative electrode through the separator. In such a case, it is preferred that the wound electrode body is accommodated in the can body so that the winding axis of the electrode body is positioned parallel to the broader flange portion or jointed flange section. Therefore, the winding termination of the positive electrode and/or the negative electrode is located at the side of the broader flange portion or jointed flange section, resulting in shortening the length of lead necessary to be connected and obtaining effective utilization of internal volume in the battery.

It is preferred that the drawing space for lead is provided on the broader flange portion or jointed section in order to improve the sealing thereof. In this case, the arrangement of electrode body as mentioned above makes the lead element shorten. If at least one of the positive and the negative electrode is made of metal foil as a collector, a part of the metal foil can be drawn out on the side of the wider flange portion or jointed flange section as mentioned above.

Further, it is preferred that a relief valve is provided at a part of the can body or the metal lid so as to be open for releasing battery internal pressure outside when a battery internal pressure goes up more than a predetermined pressure. As a method of providing this relief valve, a method of forming a cut by press processing can be taken.

According to the present invention, at least a space formed at the area of the flange section around the drawing space and a surface part of the jointed flange section are resin bonded so that the one end of the lead element is drawn out from the can body through the resin bonded space. It leads to the concurrent processes of joining the can body and the metal lid and sealing the drawing space or circumference portions of drawing space for leads so that the productivity can be improved. The resin bonding ensures the excellent sealing reliability and insulation in the drawing space. Thin type battery can be easily realized by setting each depression of the can body and the metal lid within a predetermined depth.

When the battery is provided with the protection circuit, the drawing space is formed in a part of the flange portion of the joint flange section for arranging the protection circuit. Since the protection circuit can be accommodated effectively, as a battery provided with the protection circuit, the volume energy density can be improved. In such a case, like a battery using lamination films described above, there is no need to bend the lead element which is protruded from the outer case when setting the protection circuit in the flange portion.

The battery can body comprises a depression and a flange portion in the circumference part of the opening thereof which keeps air-tight and fluid-tight inside the battery can by joining the depression and the metal lid. This leads to utilizing the joint flange section for making easier inserting/ejecting operation of the device. For example, if the guide portion corresponding to the joint flange section of the battery can is formed in the portion for attaching the battery to a device, only inserting and then sliding joint flange section towards the guide portion make inserting/ejecting operation to the device possible. Therefore, the battery having a good attachment property can be realized and also the battery can be easily removed from the device at disposal after usage.

The can body has the structure wherein the flange section is formed in the circumference part of the opening, and the can body and the metal lid are jointed in the flange section. Therefore, for example, when a part of bonding by laser welding is carried out, other materials of the battery are separated comparatively far from the welding portion, thereby avoiding the heat effect to battery components i.e., insulating packing, electrode, separator etc. Moreover, when the metal lid is resin bonded, for example heat bonding, all round the flange section of the can body, the battery can be effectively produced with lower cost compared with the welding process.

In the present invention, the can body in the form of plate prepared by a means of shallow drawing is preferably used so that the battery can having a thickness of 3 mm or less can be comparatively easily produced. In such a case, limitation as to materials is rare, differing from using the can prepared by a means of deep drawing process, and it is possible to choose the materials having required properties from the various materials without limitation. Therefore, the battery can be easily obtained with having a thickness of 3 mm or less and high tolerance to protrusion, bending and expanding. The metal lid had better be provided with the same above characteristics.

The metal lid and the surface of the can body (see the bottom 31d of the depression 31 in FIG. 1) which are opposite to each other are formed to have convexes toward the interior of the battery and the amount of deformation of the central projection is 0.05-0.3 mm so that the expansion in a thickness direction of the battery can due to the expansion of the electrode bodies and increase of internal pressure in the battery can be depress effectively.

The width of flange portion having a drawing space and the jointed flange section is wider 1 mm or more than the other flange width so that the protection circuit can be attached to this wider flange portion and wider jointed flange section. Therefore, when the protection circuit is provided, there is no need to keep the space for the protection circuit, differing from, for example, a battery with lamination films.

The wound electrode body described above is accommodated in the can body so that the winding axis of the electrode body is positioned parallel to the broader flange portion or jointed flange section. And the winding terminations of the positive electrode and/or the negative electrode are located at the side of the broader flange portion or jointed flange section. In such a case, the lead elements are connected to the winding terminations of the positive electrode and/or the negative electrode so that the lead elements are guided out in the shortest range at the side of the broader flange portion or jointed flange section. Concurrently, the connection overlap width, normally welding overlap width, of the leads regarding the positive electrode and/or negative electrode can be narrow.

When a metal foil is used as a collector in the positive electrode and/or negative electrode, a part of the metal foil is extended from the winding terminations so that its extension part serves as the lead element. In such a case, there is no need to provide the lead element. One of the lead elements is electrically connected to the can body and/or the metal lid. Or the can body and/or the metal lid can be conducted to one of the electrodes. Consequently the can body and/or the metal lid can be used as the electrode terminals. In such a case, the connection between the lead elements and the can body and/or the metal lid is preferably carried out by joint method such as a resistance welding, a laser welding or an ultrasonic welding. Furthermore, the lead element can be connected to either the can body or the metal lid and further both of the can body and the metal lid can be conductive by connection through a means of a resistance welding, a laser welding, an ultrasonic welding, screwing, caulking or metal piece. When the metal foil is used as a collector of the positive electrode and/or the negative electrode, the metal foil can be connected to the can body and/or the metal lid.

As described above, when the lead elements are electrically connected to the winding terminations of the wound electrode body and are guided out at the side of the broader flange portion or jointed flange section, the connection overlap width, or welding overlap width, of the leads regarding the positive electrode and/or negative electrode can be narrowest. When a part of the metal foil as a collector at the side of the winding terminations is extended and guided out at the side of the broader flange portion or jointed flange section, welding of the positive electrode and/or negative electrode is not required. In any case, a desired spread area of the electrode active materials can be increased. When the lead elements are connected to the winding leader section of the wound electrode body or in the width direction end of the intermediate part between the winding leader section and the winding terminations, it is inevitable that the thickness of the wound electrode body is added to the thickness of the lead element. However, the above structure leads to avoidance of the addition of the thickness by connection to the lead elements. Therefore, the thickness of the wound electrode body can be decreased as the same amount as the thickness of the lead element. Furthermore, the battery can be thinner or the number of winding can be added because the thickness of the lead element can be omitted.

A cut prepared by press processing is provided as a relief valve at a part of the can body or the metal lid so as to be open for releasing battery internal pressure outside by breaking the cut when a battery internal pressure goes up more than a predetermined pressure.

BRIEF DESCRIPTION OF THE DRAWINGS

These and other objects and features of the present invention will become clear from the following description taken in conjunction with the preferred embodiments thereof and the accompanying drawings throughout which like parts are designated by like reference numerals, and in which:

FIGS. 9A and 9B show an example of a structure in which only an edge part side of one of a can body and a metal lid constituting a jointed flange section is folded, and FIG. 9A is a partial cross-sectional view showing a structure in which an edge part side of a metal lid is folded, and FIG. 9B is a partial cross-sectional view showing a structure in which an edge part side of a can body is folded, respectively;

DETAILED DESCRIPTION OF THE PREFERRED EMBODIMENTS

The present invention will be explained more specifically below.

<Battery Can>

In a battery can, as a material for, a can body and a metal lid, for example, an iron plate, a nickel plate, an aluminum plate, a plate of an alloy of these metals, a magnesium alloy plate, a stainless steel plate, a rolled steel plate plated with nickel, a stainless steel plate plated with nickel and the like can be used. From the aspect from the strength and the lightness, it is preferable to use an aluminum alloy and a magnesium alloy which are a high strength material, and are light, and have 70 or larger of Hv (Vickers hardness). Alternatively, from the aspect from the corrosion resistance to an electrolyte, it is better to use a rolled steel plate and a stainless steel plate plated with nickel. Further, in the metal lid, the same material as that of a can body may be used on a side joining with a can body, and a cladding material (which is a laminating material excellent in the strength and the lightness, e.g. nickel cladding material obtained by laminating nickel) may be used on an opposite side.

Both of thicknesses of a can body and a metal lid may be 0.2 mm or smaller, more preferably around 0.15 mm. In the battery relating to Examples described below (see FIG. 1 to FIG. 3), a can body and a metal lid have a thickness of 0.15 mm. In the present battery, since a can body is formed by shallow draw processing, a hard material having the high strength as described above can be used and, as a result, even when a plate thickness is small as described above, a battery can sufficiently stand battery swelling.

A total thickness L3 of a battery (see FIG. 3) can be 3 mm or smaller. Alternatively, when a battery shape is a rectangle projected on a plane as shown in FIG. 2, a length L4 of a longer side part thereof can be 65 mm or larger, and a length L5 of a shorter side part can be 34 mm or larger. In the battery exemplified in FIG. 1 to FIG. 3, L3 is 2.8 mm, L4 is 90 mm, and L5 is 55 mm as described later. A whole shape of the battery exemplified in the figures is a square-type, but a shape may be a disc-type or a circle-type.

A metal lid may be plate-like, or may have a depression and a flange portion as in a can body. In the latter case, since a flange portion of a metal lid and a flange portion of a can body are joined and integrated, outer shapes of the both flange portions must be the same or approximately the same (e.g. when only an edge part side of one flange portion is bent), but a cross-sectional shape in a direction of a depth or a thickness of a depression may not necessarily be the same, and may be different in a metal lid and a can body.

<Electrode Body>

In the battery according to the present invention, an electrode body having a laminated structure in which a separator intervenes between a sheet-like positive electrode and a negative electrode is used. As a laminated structure of an electrode body, there can be considered (1) a structure in which plural units are laminated, each unit being a laminate of positive electrode-separator-negative electrode, (2) a structure in which belt-like laminates are laminated by folding alternately, (3) a structure in which a belt-like laminate is wound up vortex-like, and this is squeezing-deformed flat-like so that a cross-sectional shape becomes an ellipse, that is, an electrode body can be accommodated in a thin battery can. However, when the productivity, effective utilization of a volume in a battery can, and drawing out of a lead element and the like to the outside are comprehensively taken into consideration, the structure of (3) is desirable, provided that the aforementioned structures (1) and (2) are not excluded.

For example, when the present invention is applied to a lithium ion secondary battery, as materials constituting an electrode body, the following materials can be used. First, as a positive electrode material, for example, lithium cobalt oxides such as $LiCoO_2$, lithium manganese oxides such as $LiMn_2O_4$, lithium nickel oxides such as $LiNiO_2$, oxides such as $LiCo_x Ni_{(1-x)}O_2$ ($0<x<1$) in which a part of Ni of $LiNiO_2$ is replaced with other element such as Co, and metal oxides such as manganese dioxide, vanadium pentoxide and chromic acid can be used.

In addition, as a negative electrode material, for example, carbon materials such as graphite, pyrolytic carbons, cokes, glassy carbons, sintered organic polymer compounds, mesocarbon microbeads, carbon fibers, active carbon, graphite and carbon colloids, metal oxides such as $SnO_x$ and $SiO_x$ in which Li can be inserted, metal nitrides and the like can be used.

As a separator, microporous membranes comprising polyolefin such as polyethylene and polypropylene, and nonwoven fabrics such as polyethylene, polybutyl terephthalate and cellulose can be used.

<Electrolyte>

As an electrolyte, for example, a non-aqueous electrolyte obtained by dissolving an electrolyte salt in a non-aqueous solvent at about 0.1 to 2.0 mol/liter can be used. As a non-aqueous solvent in this case, for example, carbonic acid esters such as ethylene carbonate, propylene carbonate, dimethyl carbonate, methyl ethyl carbonate, diethyl carbonate, and vinylene carbonate, and esters such as γ-butyrolactone and methyl acetate can be used. Further, besides them, non-aqueous solvents of ethers such as 1,3-dioxolane and 1,2-dimethoxyethane, sulfur-containing compounds such as sulfolane, nitrogen-containing compounds, silicon-containing compounds, fluorine-containing compounds, and phosphate-containing compounds alone or non-aqueous solvents obtained by mixing two or more of them can be used. On the other hand, as the electrolyte salt, for example, $LiPF_6$, $LiClO_4$, $LiBF_4$, $LiAsF_6$, $LiC_nF_{2n+1}SO_3$ ($n \geq 1$), $(C_mF_{2m+1}SO_2)(C_nF_{2n+1}SO_2)NLi$ ($m \geq 1, n \geq 1$), $(RfOSO_2)_2NLi$ [Rf is a halogenated alkyl group having a carbon number of 2 or larger. Rfs may be the same or different, or Rfs may be combined together, for example, may be combined together into a polymer] and the like can be used. For the purpose of suppressing an inner pressure of a battery or improving, hypercharging property, storage property, cycle property and the like, aromatic compounds such as alkylbenzene, fluorobenzene and anisole, and cyclic sultone such as 1,3-propanesultone may be contained in an electrolyte.

EXAMPLES

Figure 1:
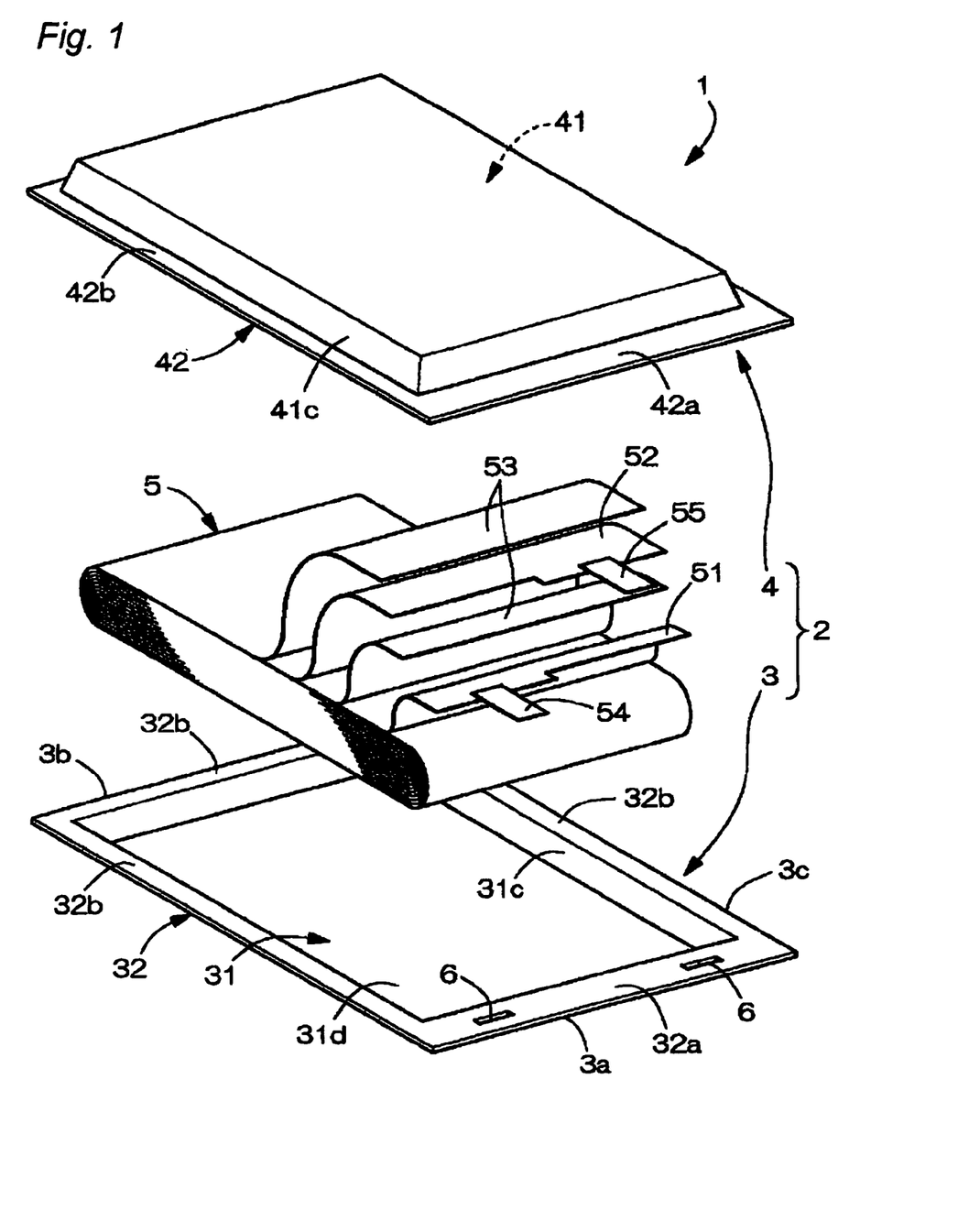
FIG. 1 is an appearance perspective showing a battery relating to one Example of the present invention.
Figure 2:
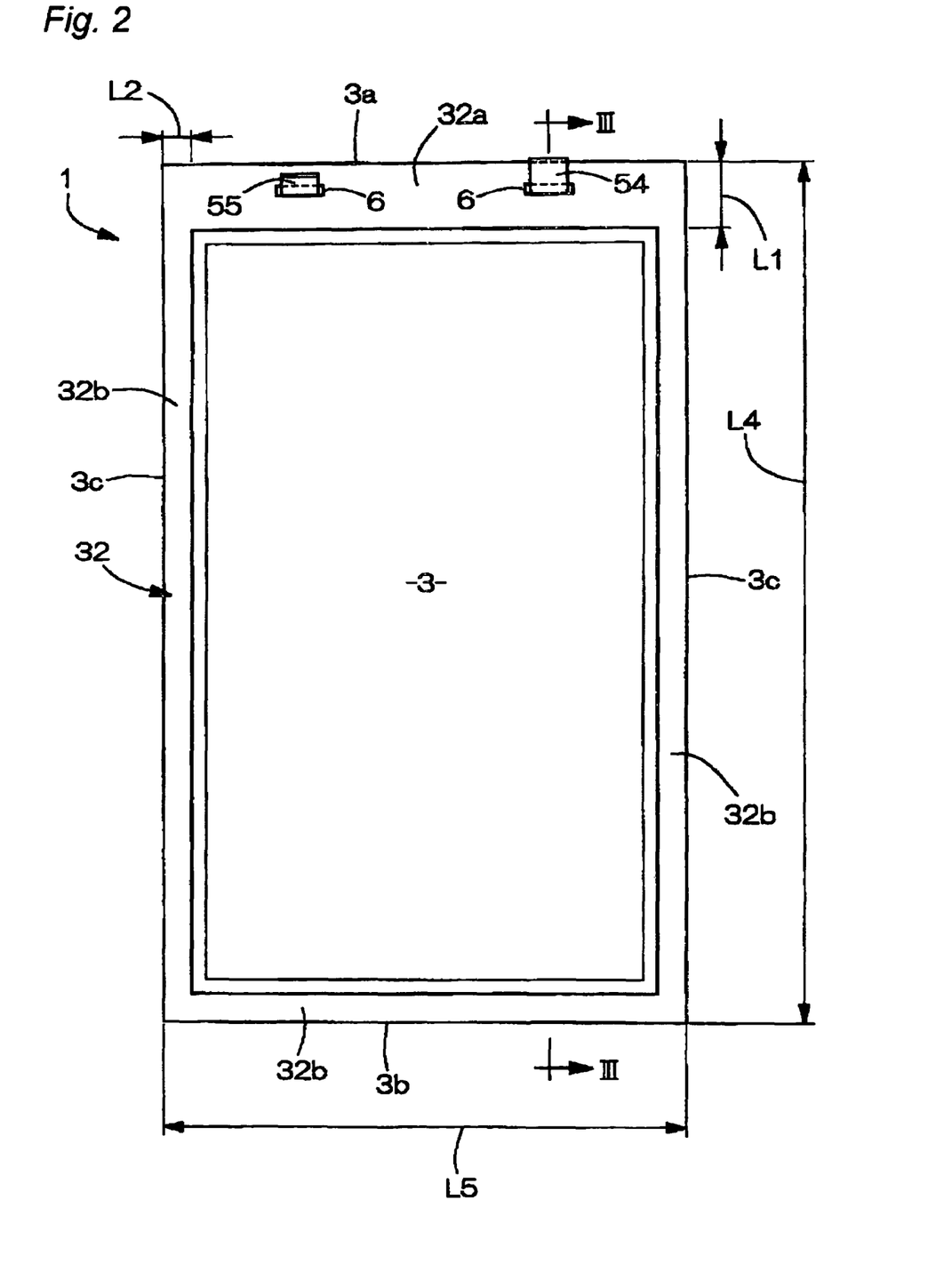
FIG. 2 is a plane view of a battery.
Figure 3:
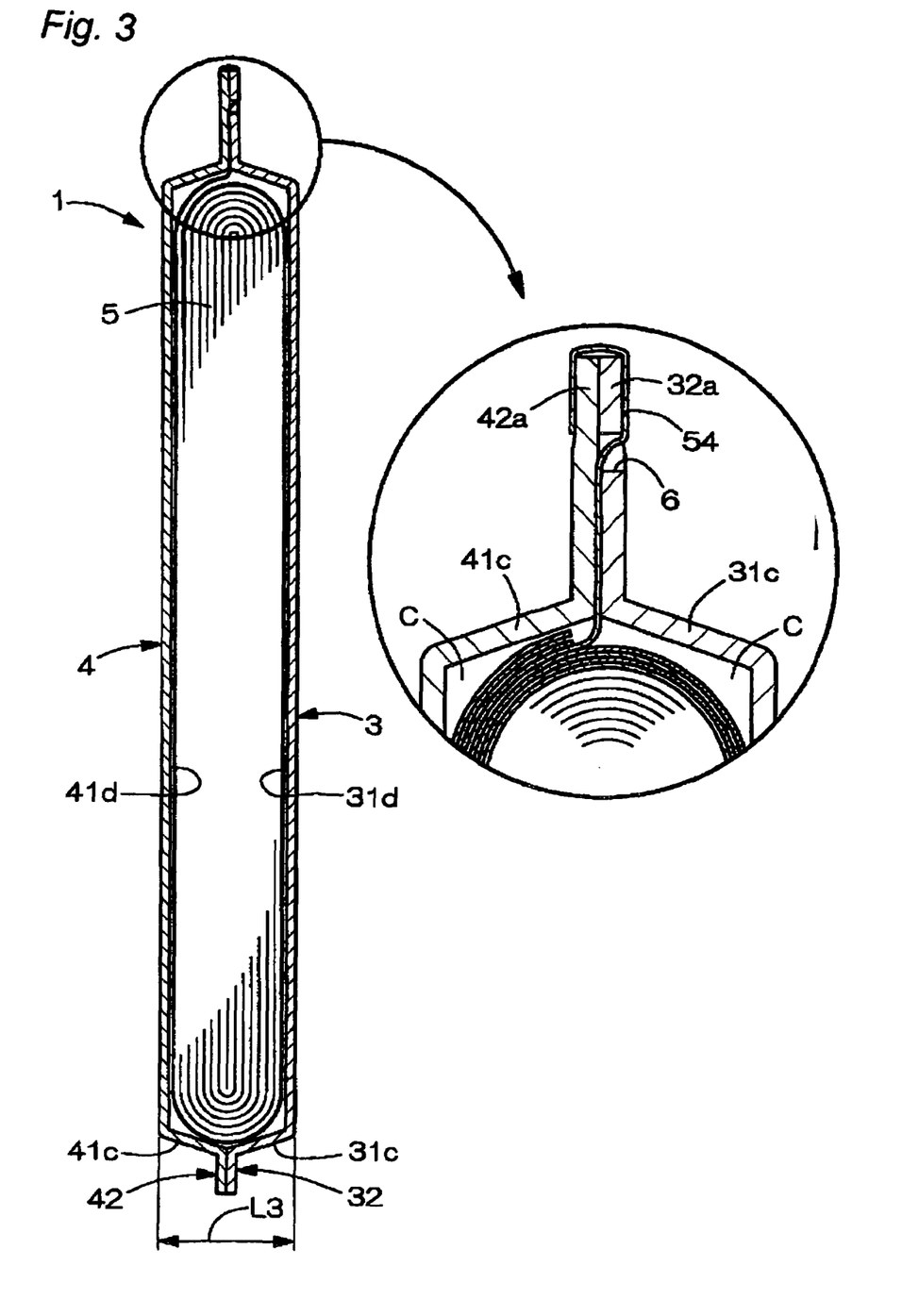
FIG. 3 is a cross-sectional view cut along III-III line of FIG. 2.

FIG. 1 to FIG. 3 show examples in which the present invention is applied to a prismatic lithium ion secondary battery (hereinafter, simply referred to as battery). In these figures, a total thickness of a battery, a plate thickness of a battery can, a thickness of an electrode body and the like are shown by exaggerating more than an actual thickness.

An battery 1 exemplified in the figures has a battery can 2 which is a rectangle projected on a plane, and which is composed of a can body 3 having a depression 31, and a metal plate 4 for sealing an opening of the depression 31 of this can body 3. An electrode body 5 and an electrolyte (not shown) are accommodated in a battery can 2.

In the electrode 5, a sheet-like positive electrode 51 and a sheet-like negative electrode 52 are laminated via a separator 53, wound up vortex-like, and squeezing-deformed into a cross-sectional ellipse shape in conformity with a cross-sectional shape of an inner space (depression 31) of a battery can 2 so that the whole can be accommodated in a battery can 2. As shown in FIG. 3, this electrode body (wound electrode body) 5 is accommodated in a battery can 2 in the state where a winding terminal thereof is parallel with a first flange portion 32a (or 42a) of a can body 3 (or metal lid 4) as described below, and is positioned near the first flange portion 32a. One end sides of lead elements (also referred to as electrically conducting tab) 54 and 55 are connected, respectively, to winding terminals of sheet-like positive electrode 51 and negative electrode 52 constituting an electrode body 5.

A can body 3 is formed into a dish form by subjecting one metal plate (aluminum alloy) to shallow draw processing and, at a circumferential part of this opening, a flat flange portion 32 is formed over its whole circumference. In this flange portion 32, a width (flange width) L1 of a flange portion (wide flange portion referred in the present invention. Hereinafter, this wide flange portion is referred to as a first flange portion in the present Example) 32a at a first shorter side part 3a situated on an upper side of a can body 3 in the state shown in FIG. 2 is wider than a width (flange width) L2 of a flange portion (second flange portion) 32b at a second shorter side part 3b situated on a lower end side of a can body 3 and at each longer side part 3c situated on both sides by 1 mm or larger. In the example shown in the figure, L1 is 7.5 mm, and L2 is 2 mm.

The first flange portion 32a of a can body 3 is provided with taking out ports 6·6 composed of two rectangular punched pores for taking out lead elements 54·55 of a positive electrode 51 and a negative electrode 52 outside of a battery can 2. These taking out ports 6·6 for lead elements are at a flange surface part except for an edge face at the first flange portion 32a, and one end thereof is situated on a side of joining with a metal lid 4, and another end is an opening end which is outside a battery.

The metal lid 4 is not provided with the aforementioned punched pore, that is, taking out ports 6·6 for lead elements. Except for this point and a point that an inclination angle of a circumferential face which forms a depression described below is slightly different from that of a can body, the metal lid 4 is constituted like the can body 3. That is, the metal lid 4 is also formed into a dish form having a depression 41 by subjecting one metal plate (aluminum alloy) to shallow draw processing, and at a circumferential part of an opening end thereof, a flat flange portion 42 is formed over a whole circumference. And, a part of this flange portion 42 is a first flange portion 42a corresponding to a first flange portion 42a of a can body 3, and the first flange portion is wider than other flange portion (second flange portion) 42b. This flange portion 42 of the metal lid 4 is jointed and integrated with a flange portion 32 of a can body 3 as shown in FIG. 3 and, by sealing an opening end of a depression 31 of the can body 3 with this jointed and integrated metal lid 4, the interior of the depression 31a (interior of battery can 2) is retained in the air tight and liquid tight state.

When the metal lid 4 and the can body 3 are jointed and integrated, at least a first flange portion 32a of the can body 3 on which taking out ports 6·6 for lead elements are provided, and a part to be combined with a first flange portion 42a of the metal lid 4 which is situated opposite thereto are sealed by joining and integrating them together using a heat welding resin, and joining and integrating of combining parts of flange portions other than the portions can be performed by any one of the group consisting of laser welding, ultrasonic welding, resistance welding, friction churning junction, pressure welding, caulking and the like (referred to as laser welding and the like in some cases), or by thermal adhesion using a resin. In the case of the former laser welding and the like, in the state where a flange portion 42 of a metal lid 4 is laid on a flange portion 32 on a can body 3, by joining a vicinity of a circumference thereof or an outer circumferential part of the combining face with laser welding and the like, both are integrated. In addition, in the case of latter thermal adhesion with a resin, by coating a resin as an adhesive on the surface of a flange portion 32 or a flange portion 42 of the metal lid 4 to be combined therewith, and transiently melting this resin with heat to thermally adhere them, both are jointed and integrated together.

Inner surfaces of the can body 3 and the metal lid 4 are insulation-treated by covering with a polypropylene film (not shown). Upon implement of this kind of insulating treatment, in the case of an insulating material which has the better joining property with a metal and has a small water permeability, the material may be covered with other polymer film and the like. For example, resin films composed of polyolefin such as polyethylene, polyethylene terephthalate or the like, or films, sheets, thin membranes and the like composed of an insulating rubber such as butyl rubber may be used. Alternatively, in the case of resin sheets of polyimide or polyphenylene sulfide which is impossible or difficult to joint with a metal, the sheet may be attached to an inner surface of the can body 3 or the metal lid 4 using an adhesive. By such the insulating treatment, a short circuit due to contact between an electrode body 5 or lead elements 54·55 and the can body 3 or the metal lid 4 can be prevented from occurring.

A circumferential side 31c which forms a side of a depression 31 of a can body 3 may be formed at a right angle relative to a flange portion 32 or a bottom surface 31d of a depression 31, but as shown in FIG. 1 and FIG. 3, it may be inclined at a prescribed obtuse angle (90 to 130 degrees) relative to a flange portion 32 or a bottom surface 31d of a depression 31. In addition, a circumferential side 41c which forms a side of a depression 41 of the metal lid 4 may be inclined at a prescribed angle (90 to 180 degrees) relative to a flange portion 42 of the metal lid 4 or a bottom surface 41d of a depression 41. By doing this, a gap C produced between an inner surface of a can and an electrode body 5 at a corner in the battery can 2 is increased slightly and, therefore, to that extent, a space which can be utilized as a reservoir for a electrolyte is increased and, as a result, an amount of an electrolyte to be injected into the battery can 2 can be increased. In the example shown in the figure, a circumferential side 31c of a can body 3 is formed by inclining at an angle of 120 degrees relative to its bottom surface 31d, and a circumferential side 41c of the metal lid 4 is formed by inclining at an angle of 175 degrees relative to its bottom surface 41d, respectively.

Further, although not shown in the figure, a notch which is to be a safety valve is formed on the metal lid 4 at press molding. In addition, a bottom surface 31d of a depression 31 of the can body 3, and a bottom surface 41d of a depression 41 of the metal lid 4 which is situated opposite thereto are formed in a slightly convex manner towards the interior of a battery, respectively. By setting an amount of deformation of these convex portion in a central projection direction at 0.1 mm, swelling of the electrode body 5 and swelling in a direction of a thickness of a battery can 2 due to increase in a battery internal pressure are suppressed.

The aforementioned battery 1 was prepared as follows:

<Preparation of Positive Electrode>

LiCoO$_2$ (positive electrode material) having a specific surface area of 0.5 m$^2$/g and carbon as an electrical conduction aid were mixed at a weight rate of 98:2, and this mixture and a solution in which polyvinylidene fluoride was dissolved in N-methylpyrrolidone were mixed to prepare a positive electrode combining agent slurry. This positive electrode combining agent slurry was filtered with a filter to remove particles having a relatively large particle diameter, this was coated uniformly on both sides of a positive electrode collector composed of an aluminum foil having a thickness of 15 μm, dried, and compression-molded with a roller press machine, followed by cutting into a prescribed size. A lead element was welded to a part which is to be a terminal upon winding, without coating a positive electrode combining agent, so that the lead element is in the same direction as a longitudinal direction of a positive electrode, to prepare a belt-like positive electrode.

<Preparation of Negative Electrode>

A graphite base carbon material (carbon material having the properties of a spacing of (002) plane, d002=0.335 nm and an average particle diameter of 15 μm) was added to a solution in which polyvinylidene fluoride was dissolved in N-methylpyrrolidone, and the materials were mixed to prepare a negative electrode combining agent slurry. This negative electrode combining agent slurry was filtered with a filter to remove particles having a relatively large particle diameter, this was uniformly coated on a negative electrode collector composed of a belt-like copper foil having a thickness of 10 μm, dried, compression-molded with a roller press machine, cut, and dried, and a lead element was welded to prepare a belt-like negative electrode. Upon preparation of a wound electrode body, a negative electrode combining agent coating part was set in advance so that a negative electrode combining electrode coating part became larger than a coating part of a positive electrode by 1 mm in a width, and the negative electrode combining agent coating part was made to be greater by around 5 mm also in a longitudinal direction. However, other parts which did not correspond to a positive electrode at winding were not coated. A lead element was welded to an uncoated part provided on a part which became a terminal at winding, so that the lead element was in the same direction as a longitudinal direction of a negative electrode like the aforementioned positive electrode, whereby, a belt-like negative electrode was prepared.

<Preparation of Electrode Body>

The aforementioned belt-like positive electrode and belt-like negative electrode were laminated via a microporous polyethylene film having a thickness of 20 μm (manufactured by Tonen Chemical Corp.), and this was wound so that a cross-section became an ellipse shape, and taped to obtain a wound electrode body.

<Preparation of Electrolyte>

A mixed solvent of ethylene carbonate and methyl ethyl carbonated at a volume ratio of 1:2 was prepared, LiPF$_6$ was dissolved in this mixed solvent at the concentration of 1.2 mol/liter, and cyclohexylbenzene and 1,3-propanesultone were added so that a content of cyclohexylbenzene became 2% by weight and a content of 1,3-propanesultone became 2% by weight, to obtain a non-aqueous electrolyte.

<Preparation of Battery>

The aforementioned wound electrode body and the aforementioned electrolyte were accommodated in the battery can 2 to obtain a square-type lithium ion secondary battery having a total thickness of 2.8 mm, a length of a longer side part of 90 mm, and a length of a shorter side part of 55 mm. The wound electrode body 5 was accommodated in the battery can 2 so that its winding axis became parallel to first flange portions (wider flange portion) 32a·42a of the can body 3 and the metal lid 4, winding terminals of a positive electrode 51 and a negative electrode 52 were situated on a side of first flange portions 32a·42a, respective lead elements 54·55 connected to a positive electrode 51 and a negative electrode 52 were introduced on a side of first flange portions 32a·42a, and were taken out from the battery can through two rectangular punched pores 6·6 provided on the first flange portion 32a of the can body 3 (see FIG. 3). In addition, a lead element 54 connected to a positive electrode 51 was folded at a first flange portion end and, thereafter, was jointed to first flange portions 32a·42a by welding, and was electrically connected with the can body 3 and the metal lid 4, and the can body 3 was utilized as a positive electrode terminal. A part of a lead element 55 connected to a negative electrode 52 which was situated near a punched pore 6 was insulation-treated by winding with an insulating tape in advance, in order to prevent a short circuit between a positive electrode 51 due to contact with a part of a notch of a punched pore 6 which had not insulation-treated. In addition, the can body 3 and the metal lid 4 were jointed and integrated together at flange portions 32·42 by adhesion using a heat welding resin.

<Assessment>

The thus prepared buttery was charged at a constant current and a constant voltage by setting an upper limit at 4.2 V and, when the battery was discharged to 3 V at a constant current and a discharge volume was measured, a volume of 1200 mAh was shown, ad it was confirmed that the battery sufficiently functioned as a thin-type battery of 3 mm or smaller.

COMPARATIVE EXAMPLE

Figure 4:
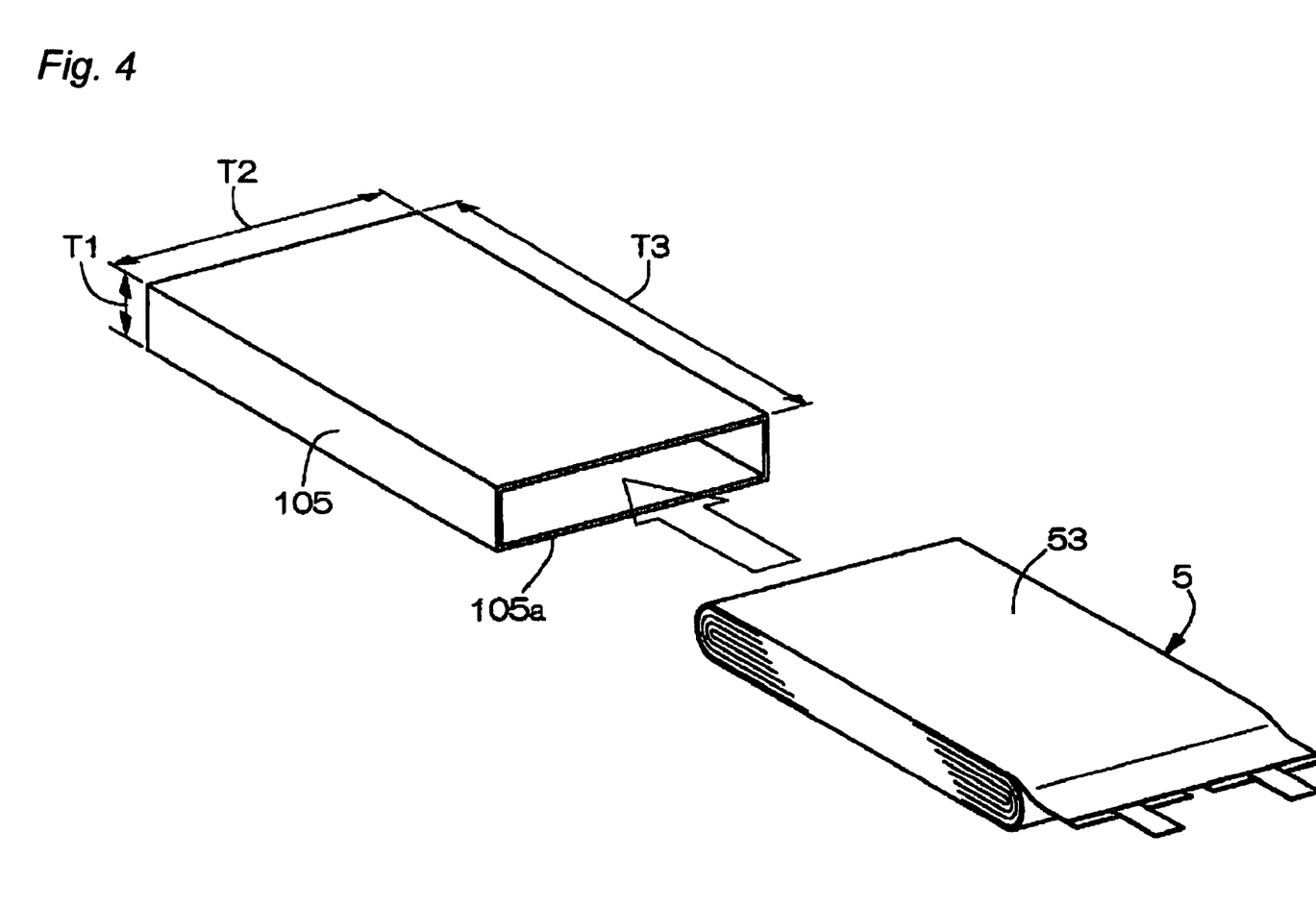
FIG. 4 is a view which is used for explaining procedures for inserting a wound electrode body into a battery aluminum alloy can (deep-drawn can) in Comparative Example of the present invention.

As shown in FIG. 4, the wound electrode body 5 constructed as in the aforementioned Example was tried to be inserted into a battery aluminum alloy can (deep-drawn can) 105 having an outer thickness (T1) of 3.4 mm, a width (T2) of 51 mm and a height (T3) of 80 mm, whereby, such the inconveniences occurred frequently that a separator 53 present at an outermost circumferential part of a wound electrode body 5 was contacted with an opening end 105a of the alloy can 105, thus, the wound electrode body was not well inserted, and the separator 53 was broken.

OTHER EXAMPLES

Other Examples or structural examples of the present invention will be explained below.

Figure 5:
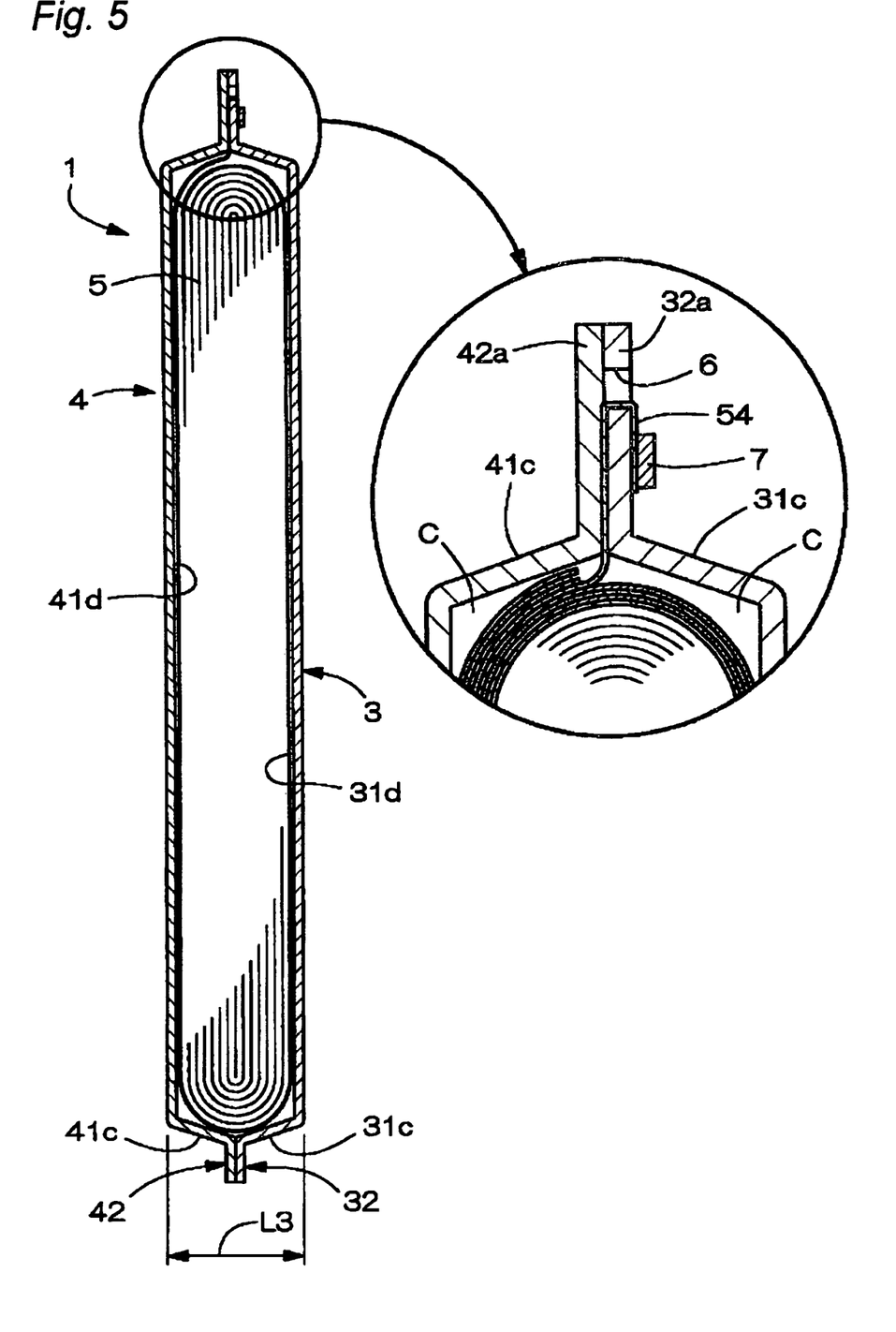
FIG. 5 is a longitudinal cross-sectional view showing a battery relating to other Example of the present invention.

FIG. 5 is a longitudinal cross-section cut at the same position as that of FIG. 3 so that a cross-sectional structure of a part surrounding a taking out port 6 for a lead element can be understood in the battery relating to other Example of the present invention. In the previous Example, as shown in FIG. 2 and FIG. 3, such the construction was adopted that other end side of a lead element (for positive electrode) 54 taken out from a battery can through a taking out port 6 provided on first flange portion 32a of a can body 3 is folded towards a depression side of a metal lid 4 at an end (edge part) of a first flange portion 32a, this was welding-jointed with both first flange portions 32a·42a of the can body 3 and the metal lid 4, whereby, the can body 3 is electrically connected with the metal lid 4 and, at the same time, the can body 3 is utilized as a positive electrode terminal. To the contrary, in a battery shown in FIG. 5, such the construction is adopted that other end side of a lead element (for a positive electrode) 54 taken out from a battery can through a taking out port 6 provided on a first flange portion 32a of a can body 3 is folded towards a depression side of the can body 3, and electrically connected with a flange surface part of the first flange portion 32a, an output terminal 7 is arranged on this part, that is, on the surface of an end on other end side of a lead element 54, and these are integrally welded and adhered to the aforementioned flange surface part. Since this construction is approximately the same construction as that of the aforementioned Example expect for those points, the same symbols as those of FIG. 3 are attached, and their explanation is omitted. In addition, FIG. 5 shows a structure in which an output terminal 7 is attached to an end of other end side of a lead element 54 taken out from a battery can. However, a structure in which an end of other end side of a lead body 54 is arranged on a flange surface part of a first flange portion 32a (structure in which an output terminal 7 is not attached) may be of course adopted.

According to such the construction, for example, fixation of a lead element 54 becomes easy as compared with a structure in which a lead element 54 is drawn around at an edge part of a first flange portion 32a (see FIG. 3). In addition, since not only a length of a lead element 54 becomes short, but also a lead element is not projected outside, dimensionally loss is excluded, and a volume energy density becomes high.

Figure 6:
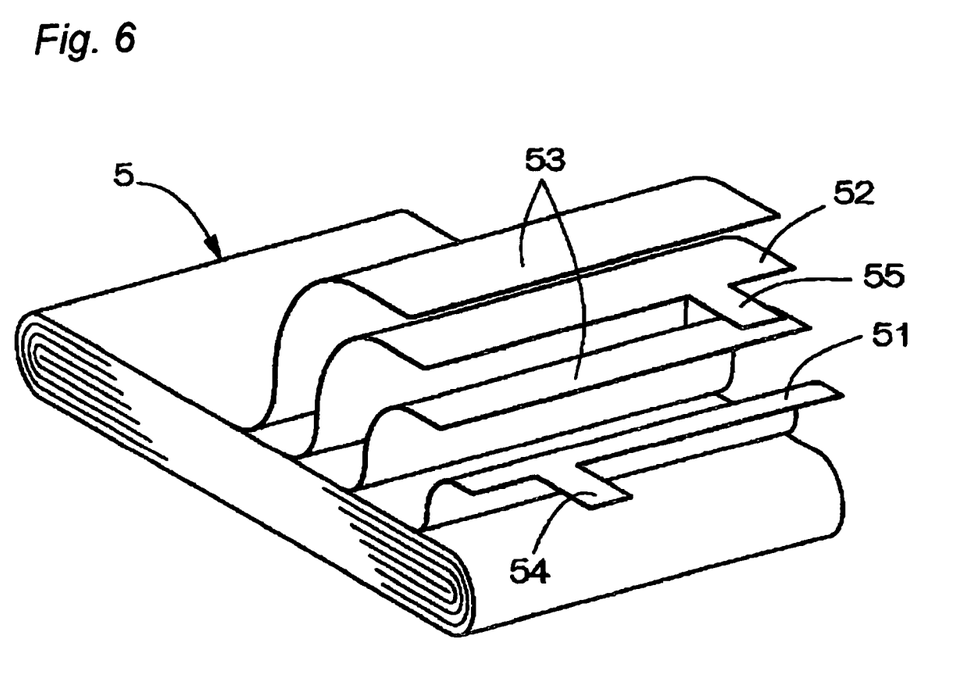
FIG. 6 is a perspective showing other example of a structure of a battery (wound electrode body)

FIG. 6 shows other example of a construction of lead elements 54·55. In this example, respective metal foils as collectors constituting a positive electrode 51 and a negative electrode 54, respectively, of a wound electrode body 5 (in the same figure, same symbols as those of positive electrode and negative electrode are used) function also as lead elements 54·55. Specifically, respective metal foils constituting a positive electrode 51 and a negative electrode 52, respectively, are provided with an extension part functioning also as lead elements 54·55, on its winding terminal side. This extension part (lead elements 54·55) is formed so that a width and a position thereof correspond to taking out ports 6·6 for a lead element at a first flange portion 32a shown in FIG. 1 and FIG. 2. A tip side of each extension part which is to be other end of respective lead elements 54·55 is taken out from a battery can through taking out ports 6·6 provided on first flange portion 32a as in the above mentioned lead elements 54·55 shown in FIG. 3 or FIG. 5, and can be electrically connected to a prescribed site.

According to such the construction, since provision of a lead element is attained by forming an extension part (lead elements 54·55) at one end which is to be a winding terminal upon preparation of respective metal foils (collectors) of a positive electrode 51 and a negative electrode 52 (foils are usually prepared by punching processing with a press), it is not necessary to prepare a lead element separately, and a step of electrically connecting such the lead element to an end of a metal foil by welding or the like becomes also unnecessary. Therefore, the number of steps and the cost can be reduced.

FIG. 7 to FIG. 10 show other examples of a structure of a joining part between a flange portion 32 of a can body 3 and a flange portion (circumferential part) 42 of a metal lid 4, that is, a jointed flange section.

Figure 7:
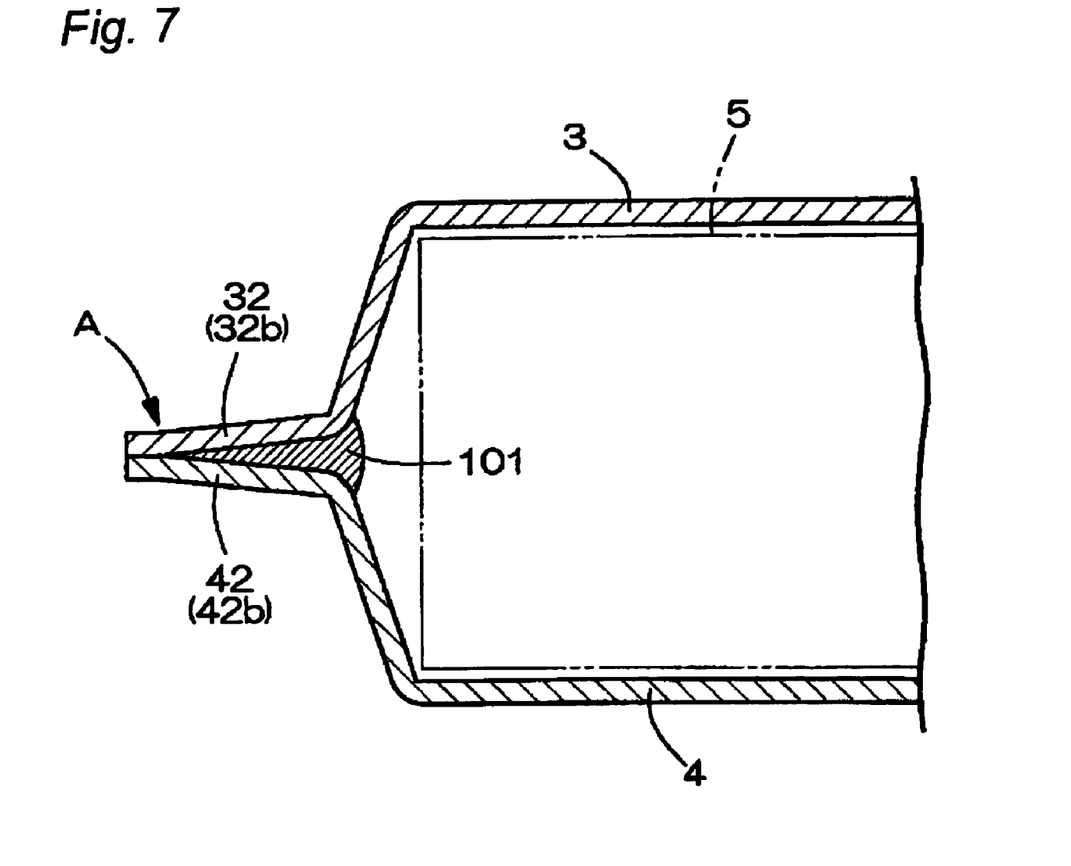
FIG. 7 is a partial cross-sectional view showing an example of a structure in which an outer circumferential part of a jointed flange section is welded, and its inner surface side is sealed with a resin in advance.

Among them, FIG. 7 shows a structure in which, among a jointed flange section, other flange portion except for first flange portions 32a·42a provided on the aforementioned taking out ports 6:6 for a lead element, that is, an inner surface side of a conjugated part of second flange portions 32b·42b (see FIG. 1 and FIG. 2) is sealed with a resin 101 in advance, and an outer circumferential part A of this jointed flange section sealed with a resin (jointed and integrated second flange parts 32b·42b) is jointed by laser welding, whereby, this jointed flange section is doubly sealed. In this case, welding of an outer circumferential part A of a jointed flange section is not limited to laser welding, but welding may be performed using caulking, or pressure welding, or other joining means such as ultrasonic welding, resistance welding, friction churning junction and the like which will be described below. Whichever the means is used, the sealability at a jointed flange section can be enhanced by taking the aforementioned double sealing structure.

Figure 8:
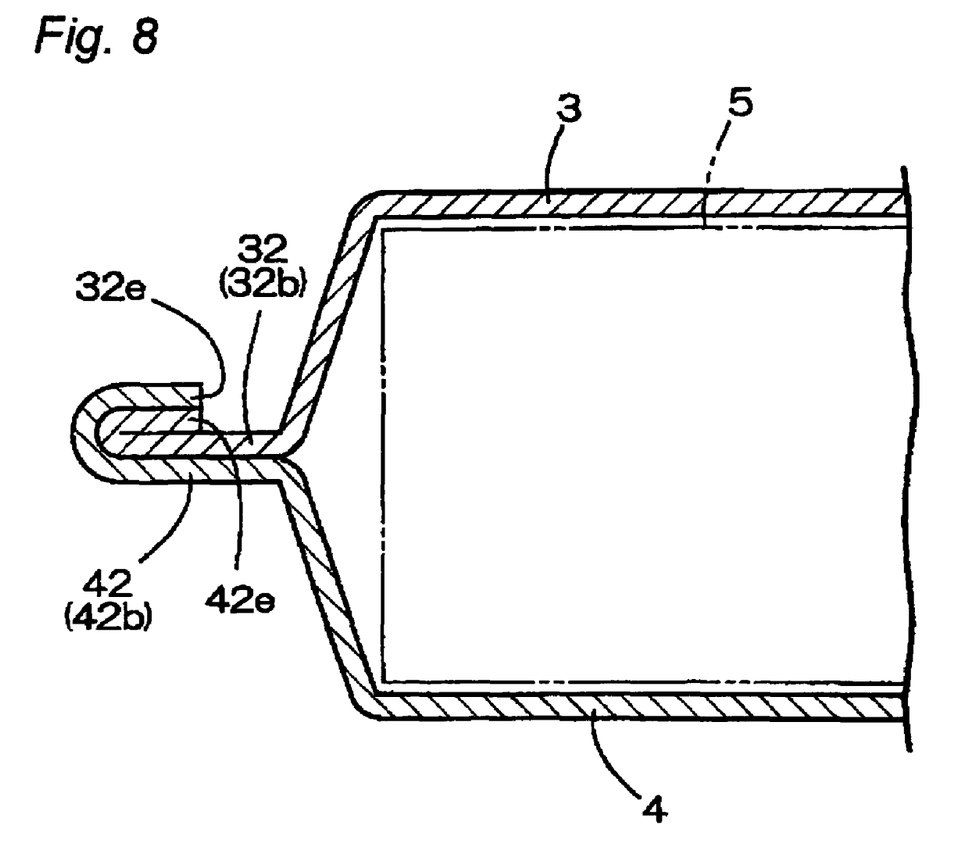
FIG. 8 is a partial cross-sectional view showing an example of a structure in which both edge part sides of a can body and a metal lid constituting a jointed flange section are folded.
Figure 9A:
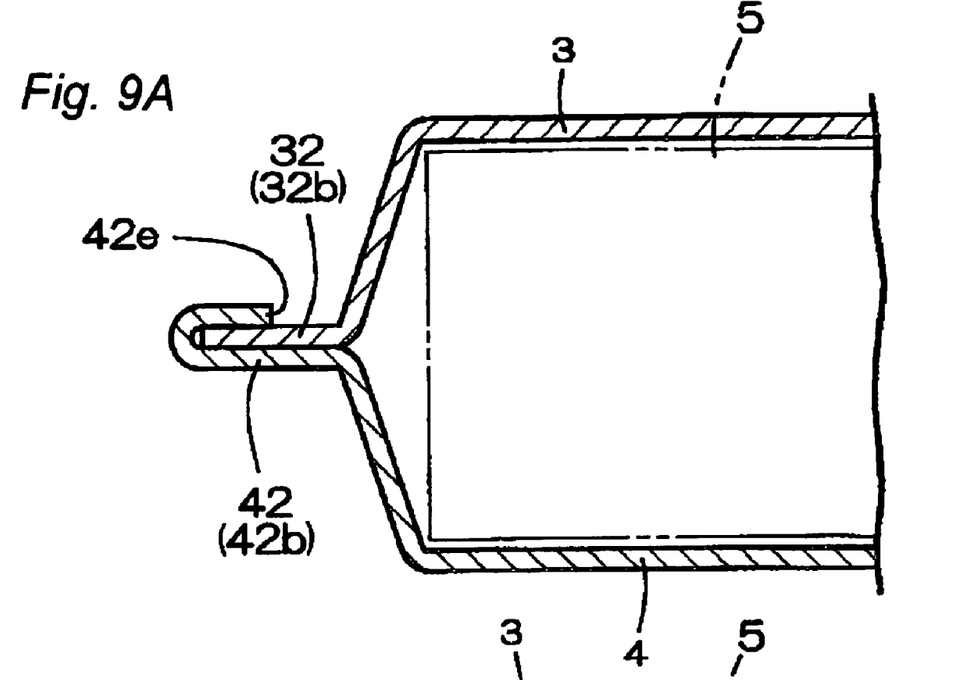
Figure 9B:
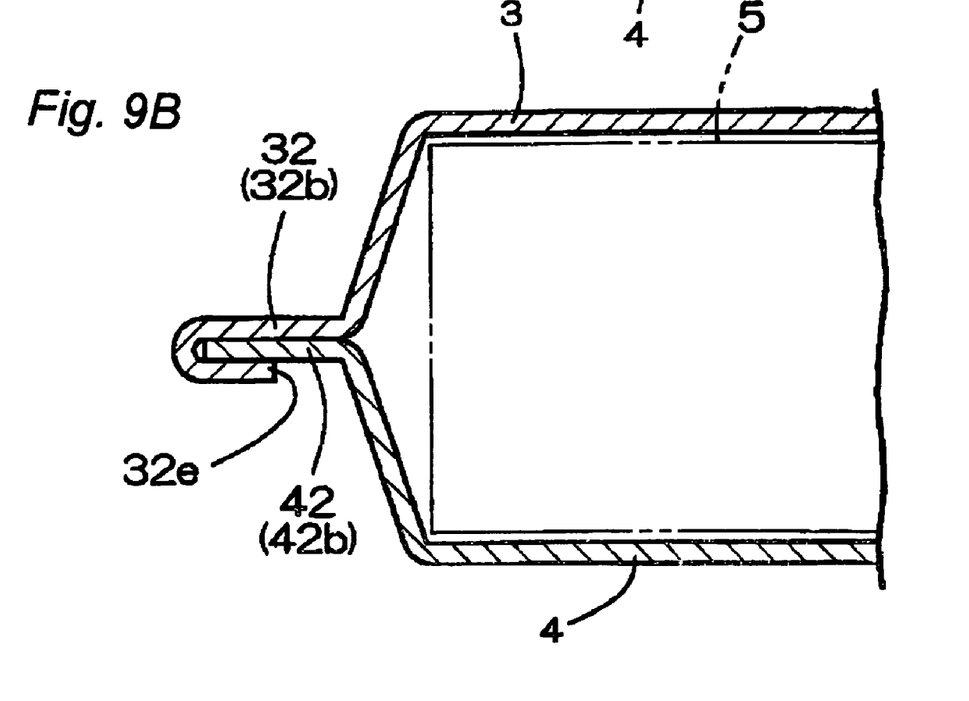
Figure 10:
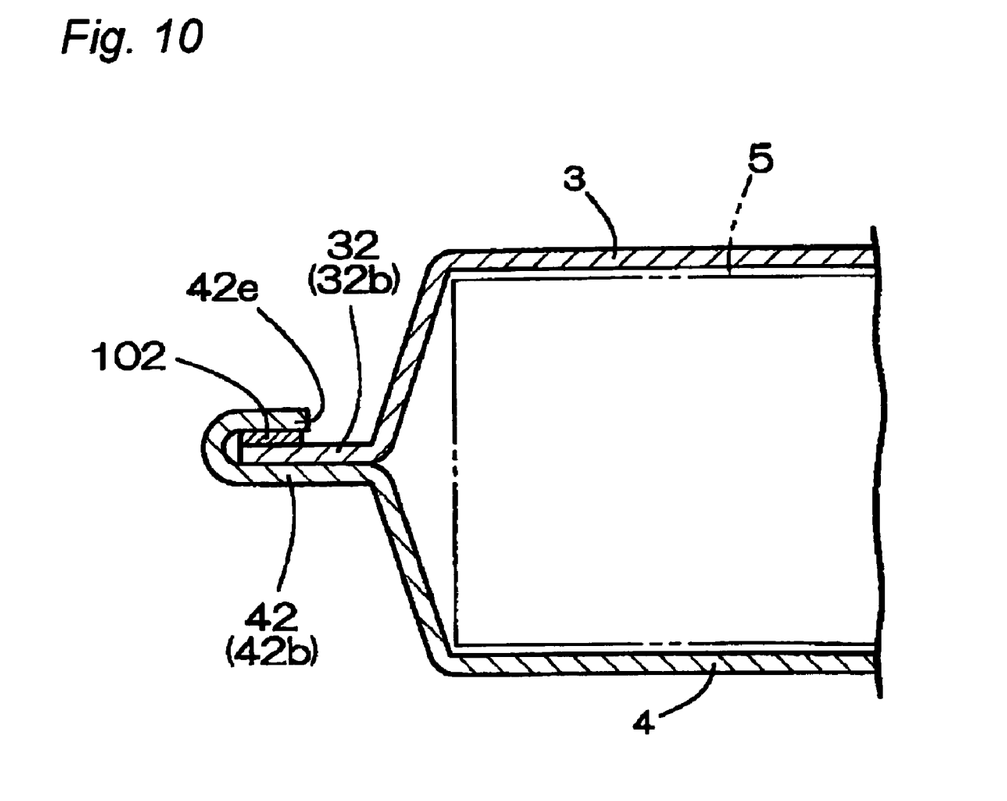
FIG. 10 is a partial cross-sectional view showing an example of a structure in which a folding part of a can body and a flange portion of a metal lid in the case shown in FIG. 9 are adhered between their opposite faces with a resin.

FIG. 8 to FIG. 10 show examples in which an edge part side of a jointed flange section is bent towards an inner circumferential side. In this case, as shown in FIG. 8, in the state where a flange portion 32 on a can body 3 side and a flange portion 42 on a metal lid 4 side are laid, these edge part 32e·42e sides may be bent towards an inner circumferential side at the same time, or as shown in FIG. 9 A·B and FIG. 10, only an edge part side of any one of a flange portion 32 on a can body 3 side and a flange portion 42 on a metal lid 4 side may be bent towards an inner circumferential side so that it is further laid on other edge part. FIG. 9A shows the state where an edge part 42e side of a flange portion 42 in a metal lid 4 is bent, and B of the same figure shows the state where an edge part 32e side of a flange portion 32 in a can body 3 is bent. In addition, when only an edge part side of any one of a flange portion 32 on a can body 3 side and a flange portion 42 on a metal lid 4 side is bent like this, further as shown in FIG. 10, a part (a bending part) on a bent edge part (an edge part 32e of a flange portion 32 on a can body 3 side in an example shown in the figure) and a counterpart flange portion (a flange portion 42 on a metal lid 4 side in an example shown in the figure) may be adhered with a resin 102. By doing like this, since the sealability is improved, leakage of a liquid at this part, entrance of moisture from the outside and the like can be assuredly prevented.

In addition, according to the structures exemplified in FIG. 7 to FIG. 10, since a jointed flange section other than first flange portions 32a·42a side on which taking out ports 6·6 for a lead element are provided is welded and sealed mainly by means such as welding other than a resin, it becomes possible to make a flange width of the jointed flange section narrower as compared with the case of sealing with a resin. That is, when sealing with a resin is performed at a jointed flange section, it is necessary to assure a constant flange width in order to assure the adhesion strength. However, when joining and sealing means such as the aforementioned welding and caulking other than a resin are used, joining is possible even when a flange width is relatively narrow. Therefore, since it is possible to make a flange width narrower as compared with resin sealing, it becomes possible to increase a volume energy density of a battery by that extent.

EFFECT OF THE INVENTION

According to the present invention, a thin-type battery which is excellent in the attachability to equipments in which a battery is mounted and in which a protecting circuit can be also installed by a simple wiring can be realized. That is, since a taking out part for a lead element (a part surrounding a port for taking out a lead element) can be sealed by a process at the same time with joining and integrating a can body and a metal lid, the productivity is enhanced. In addition, by performing sealing with a resin, the excellent sealing reliance and insulating property of a lead element taking out part can be assured. Thinning of a battery can be easily attained by making depths of respective depressions of a can body and a metal lid within a prescribed scope.

When the battery according to the present invention is provided with a protecting circuit, by providing a lead element taking out port on a part of a flange surface part of the same jointed flange section as a jointed flange section on which a protecting circuit is provided, a protecting circuit can be accommodated very effectively without bending a part of a lead element projecting into a battery outer frame as in a battery using a laminating film, whereby, a volume energy density as a battery equipped with a protecting circuit is increased and, at the same time, the assembling workability is also improved.

Upon welding of a can body and a metal lid by laser welding or the like, since the welding or the like can be performed at a position relatively remote from other part materials, the thermal influence on various parts constituting a battery such as insulating packing, electrode and separator can be avoided. In addition, since there is hardly limitation of materials like the case using a deep-drawn can, and a material having the necessary property can be relatively freely selected among various materials, a battery which is excellent in resistance to piercing, resistance to bending and resistance to swelling in spite of a total thickness of 3 mm or smaller can be relatively easily obtained.

Further, when a wound electrode body is used as an electrode body and, in the state where its winding axis is parallel to a wider flange portion of a can body and positive electrode and negative electrode winding terminals are situated on a wider flange portion or wider jointed flange section, the wound electrode body is accommodated in an electrode can, since positive electrode and negative electrode winding terminals approach a wider flange portion or a wider jointed flange section of a can body, a length of a lead element which becomes necessary for connecting a positive electrode or a negative electrode and an outside protecting circuit can be shortened, and a volume in a battery can may be effectively utilized. In addition, by arranging the wound electrode in a battery can as described above, since a welding margin of a lead element to a positive electrode and/or a negative electrode can be minimized, or welding of a lead element to a positive electrode/or a negative electrode itself can be made unnecessary, a coating area of an electrode active substance can be increased to that extent.

What is claimed is:

1. A battery which comprises an electrode body made of lamination of a sheet-like positive electrode and a sheet-like negative electrode through a separator, a battery can body comprising a depression provided with a flange portion at a circumference part thereof for accommodating at least a part of said electrode body together with an electrolyte and a metal lid provided with a circumference portion used for sealing an opening of said can body by joining said flange portion and the corresponding circumference portion thereof, wherein one end of each lead element connected to said positive and negative electrode respectively is drawn out from said can body through a space formed at a surface part of said jointed flange section and the area of said flange section wound the drawing space is sealed by a resin bonding, wherein one of the flange portion and the jointed flange section is wider 1 mm or more than the other flange width, and wherein said electrode body is formed in a cross-sectional shape of ellipse in a direction perpendicular to a winding axis of said electrode body by winding laminating of the sheet-like positive electrode and the sheet-like negative electrode through the separator and is accommodated in said can body so that the winding axis of said electrode body is positioned parallel to the broader flange portion or jointed flange section and the winding terminations of said positive electrode and/or said negative electrode are located at the side of the broader flange portion.

2. The battery according to claim 1, wherein said positive electrode and/or negative electrode have a metal foil as a collector, which extension part serves as said lead element.

3. The battery according to claim 1 or 2, wherein the drawn end of said lead element is located on the flange section or in a space which intersects perpendicularly with said flange section.

4. The battery according to claim 1, wherein output terminals are located on the flange section or in a space which intersects perpendicularly with said flange section and electrically connected to each drawn end of the leads.

5. The battery according to claim 1, wherein the other part of the jointed flange section except wound the drawing space is sealed by at least one of means selected from the group consisting of a laser welding, an ultrasonic welding, a resistance welding, friction churning junction, and a pressure welding.

6. The battery according to claim 5, wherein the jointed flange section is provided with a double sealing portion made of a preliminary inside resin sealing in addition to the sealing made by means of claim 5.

7. The battery according to claim 1, wherein at least one of the flange portion of said can body or the circumference portion of said metal lid has an extension part capable of being folded back in the direction where the other portion of the jointed flange section may be overlapped further.

8. The battery according to claim 7, wherein at the folded back portion of the jointed flange section, at least a part of said can body and said metal lid is sealed by resin.

9. The battery according to claim 1, wherein said can body and/or metal lid are formed by means of shallow drawing of a metal plate.

10. The battery according to claim 1, wherein said metal lid and the surface of the can body which is opposite thereto are formed to have convexes toward the interior of the battery and the amount of deformation of the central projection is 0.05-0.3 mm.

11. The battery according to claim 1, wherein the drawing space for lead is provided in the broader flange portion or jointed flange section.

12. The battery according to claim 1, wherein a safety valve is provided at a part of said can body or said metal lid so as to be open for reteasing battery internal pressure outside of the battery when a battery internal pressure goes up more than a predetermined pressure.

* * * * *